(12) United States Patent
Warner

(10) Patent No.: US 8,162,558 B2
(45) Date of Patent: *Apr. 24, 2012

(54) MULTI-SECTIONAL NUT AND ADJUSTABLE LENGTH POLE INCORPORATING SUCH NUT

(76) Inventor: Terry P. Warner, Port Byron, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/673,040

(22) Filed: Feb. 9, 2007

(65) Prior Publication Data

US 2007/0140809 A1 Jun. 21, 2007

Related U.S. Application Data

(62) Division of application No. 11/017,260, filed on Dec. 20, 2004, now Pat. No. 7,198,236.

(51) Int. Cl.
*F16B 7/10* (2006.01)

(52) U.S. Cl. .................. 403/109.1; 403/377; 248/125.8; 248/188.5; 248/354.1; 411/267

(58) Field of Classification Search .... 403/109.1–109.5, 403/109.7, 109.8, 377, 374.3, 374.4, 318, 403/325, 248, 411; 248/188.5, 157, 178.1, 248/125.8, 354.1; 411/265, 266, 267, 268, 411/433, 437; 279/35

See application file for complete search history.

(56) References Cited

U.S. PATENT DOCUMENTS

| | | | | |
|---|---|---|---|---|
| 423,386 A | * | 3/1890 | Miller | 279/35 |
| 553,226 A | * | 1/1896 | Brockett | 279/35 |
| 1,308,176 A | * | 7/1919 | Field | |
| 1,312,942 A | * | 8/1919 | Anderson | |
| 1,634,422 A | * | 7/1927 | Holmes | 403/373 |
| 2,261,393 A | * | 11/1941 | Kothny | |
| 2,448,342 A | * | 8/1948 | Zagar | 279/35 |
| 2,448,817 A | * | 9/1948 | McArthur | 403/321 |
| 3,024,051 A | * | 3/1962 | Hullinger | 403/327 |
| 3,777,516 A | * | 12/1973 | Tigges | |
| 3,856,421 A | * | 12/1974 | Nogler | 403/118 |
| 4,493,469 A | * | 1/1985 | Holobaugh | 248/406.1 |
| 4,618,300 A | * | 10/1986 | Goebel | 411/433 |
| 4,860,987 A | * | 8/1989 | Werner | 248/405 |
| 4,976,174 A | * | 12/1990 | Walsh | 403/325 |
| 5,081,811 A | * | 1/1992 | Sasaki | 52/223.13 |
| 5,378,100 A | * | 1/1995 | Fullerton | 411/267 |
| 5,613,816 A | * | 3/1997 | Cabahug | 411/433 |
| 5,733,084 A | * | 3/1998 | Fullerton | 411/267 |

(Continued)

FOREIGN PATENT DOCUMENTS

ES 2146166 A1 * 7/2000

(Continued)

*Primary Examiner* — Daniel P. Stodola
*Assistant Examiner* — Nahid Amiri
(74) *Attorney, Agent, or Firm* — George R. McGuire; Blaine T. Bettinger; Bond Schoeneck & King

(57) ABSTRACT

A nut assembly for quick adjustment of axial position relative to a threaded shaft. The nut is formed in two, physically separate sections, each having a surface portion with threads for mating engagement with the shaft. Each nut section is pivotally mounted to a bushing which surrounds the threaded shaft for movement of the nut threads into and out of engagement with the shaft threads. The sections are moved about their pivotal mountings by movement of a second bushing axially with respect to the first bushing through cooperative conical surfaces on the second bushing and on each of the nut sections.

10 Claims, 6 Drawing Sheets

U.S. PATENT DOCUMENTS

| | | | |
|---|---|---|---|
| 5,826,847 A * | 10/1998 | Warner et al. | 248/354.1 |
| 5,868,538 A * | 2/1999 | Rathbun | 411/433 |
| 6,106,035 A * | 8/2000 | Hetherington | 411/433 |
| 6,212,917 B1 * | 4/2001 | Rathbun | 411/433 |
| 6,406,240 B1 * | 6/2002 | Potter | 411/433 |
| 6,595,226 B2 * | 7/2003 | Uemura | 135/75 |
| 6,884,015 B1 * | 4/2005 | Takegawa | 411/433 |
| 7,198,236 B2 * | 4/2007 | Warner | 403/377 |

FOREIGN PATENT DOCUMENTS

| | | | |
|---|---|---|---|
| FR | 537236 | * | 5/1922 |
| FR | 1149059 | * | 12/1957 |
| GB | 558302 | * | 12/1943 |
| GB | 1270240 | * | 4/1972 |
| GB | 2275886 A | * | 9/1994 |

* cited by examiner

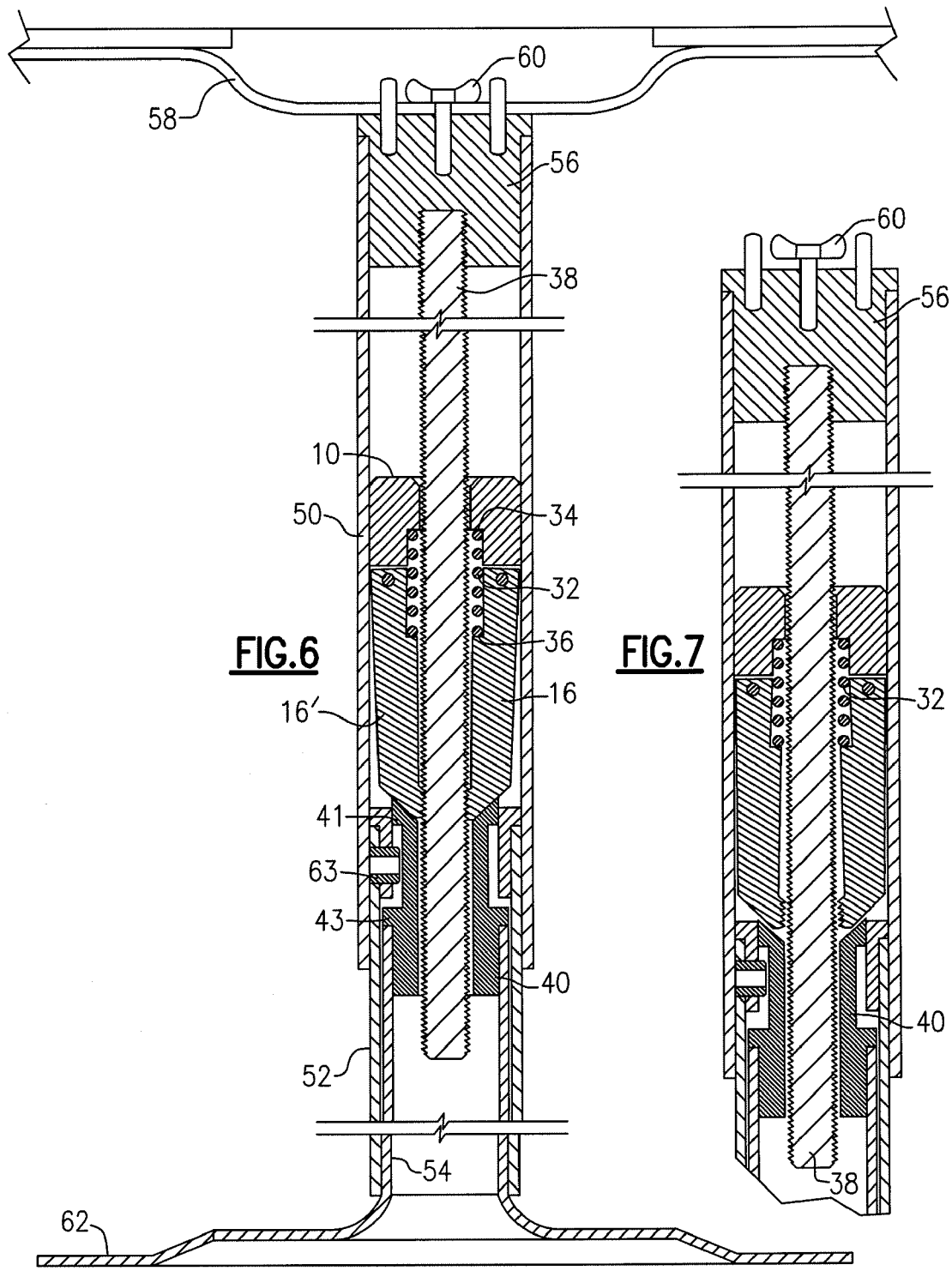

MULTI-SECTIONAL NUT AND ADJUSTABLE LENGTH POLE INCORPORATING SUCH NUT

CROSS REFERENCE TO RELATED APPLICATION

The present application is a divisional of and claims priority to Applicant's U.S. patent application Ser. No. 11/017,260, filed Dec. 20, 2004, now U.S. Pat. No. 7,198,236, the entirety of which is hereby incorporated by reference.

BACKGROUND OF THE INVENTION

The present invention relates to nuts having a plurality of sections movable into and out of threaded engagement with a threaded rod, as well as to poles having telescopingly engaged sections utilizing such nuts to permit rapid adjustment of the overall length of the pole.

U.S. Pat. No. 4,498,204 of Stanley H Warner and U.S. Pat. No. 5,826,847 of Stanley H. Warner and Terry P. Warner, the latter being the present applicant, disclose pole assemblies primarily intended for physical support of infirm or handicapped persons, i.e., to assist such persons in rising, standing, etc. by providing a sturdy support member for manual grasping at a desired location. The poles include telescoping sections permitting adjustment of the overall length of the pole and for fixing the relative axial positions of the sections at a desired point. The later of the two patents includes a multi-section nut for movement of the sections between a first position, wherein the internal threads on the nut sections engage the external threads on an elongated shaft which is fixed to and extends axially through one of the hollow pole sections, and a second position, wherein the nut threads are released from threaded engagement with the shaft. When the nut sections are engaged with the threads on the shaft, the sections of the pole are fixed to prevent relative axial movement, and when the threads on the nut sections and the shaft are disengaged the pole sections may be moved axially relative to one another to change the overall length of the pole as desired.

One of the objects of the present is to provide a nut assembly wherein a plurality of nut sections may be moved between engaged and disengaged positions with respect to an elongated, threaded shaft in a simple and expeditious manner with reliable operation of a minimal number of ruggedly constructed components.

Another object is to provide a pole assembly including a plurality of telescoping sections for selective adjustment of the overall length of the pole and incorporating in the pole structure a multi-section nut of the improved design disclosed herein to permit relative, linear, axial movement of pole sections for rapid adjustment to an approximate, desired overall length, and actuation of nut components to engage a threaded shaft forming a portion of the pose assembly for relative, rotational, axial movement of pole sections for more precise control of overall pole length.

Other objects will in part be obvious and will in pat appear hereinafter.

SUMMARY OF THE INVENTION

In the disclosed embodiments, the nut assembly of the invention includes a bushing having a central, through bore. Mounted upon the bushing are two, identical, elongated legs, each having a first and a second end. At one end the legs are supported for pivotal movement upon dowels passing through openings in the bushing and the legs, with the legs substantially parallel to the central axis of the bushing. At the other end, the legs have inner surface portions formed with portions of threads facing the central axis, and outer surface portions which are angularly disposed with respect to the central axis. A single coil spring is positioned within the bushing with one end engaging a counterbore in the bushing and the other end engaging a shoulder on each of the legs to bias the latter toward movement in a first direction about their pivotal mountings.

The nut is designed for movement of the pivot legs between first and second positions, wherein the threaded, inner surface portions are in and out of threaded engagement with a shaft passing coaxially through the bushing. When the threads on the pivot legs engage the threads on the shaft, the bushing, and other structure with which it may be associated, such as the adjustable pole disclosed herein, may be axially moved upon the shaft by relative rotation of the bushing and shaft. When the legs are moved to disengage the threads on the legs from those on the shaft, the entire nut assembly may be freely moved axially with respect to the shaft. As in the two referenced patents, this permits rapid movement of the nut assembly, and any associated structure, to an approximate, desired, axial position upon the shaft and thereafter a final adjustment to the desired position by rotating the nut assembly upon the shaft.

The nut assembly is disclosed in two embodiments, in both of which the pivot legs are moved between their first and second position by axial movement of a second bushing with respect to the first-mentioned bushing. The second bushing has a conical surface which engages the surface potions on the pivot legs which are angularly disposed with respect to the coaxial, central axes of the bushings and shaft. In a first embodiment, the first and second bushing are not mutually, physically connected and are relatively moved linearly, without rotation, for engagement of the cooperable surfaces on the second bushing and the pivot legs to move the threaded surface portions of the legs into engagement with the threads on the shaft. In a second embodiment, the first and second bushings are threadedly engaged with one another, and axial movement of the conical surface of the second bushing is effected by relative rotation of the two bushings.

The first embodiment of the nut assembly is shown in association with the pole structure to form a composite assembly wherein the nut is incorporated in an article advantageously employing the adjustable features of the not.

The structure and operation of the invention will be more readily understood and fully appreciated from the following detailed disclosure, taken in conjunction with the accompanying drawings.

BRIEF DESCRIPTION OF THE DRAWINGS

FIGS. 6 and 7 are fragmentary, front elevational views, in section and in assembled condition, of the pole and nut assemblies of FIG. 5, showing threaded portions of the nut assembly in and out, respectively, of threaded engagement with a central shaft of the assembly.

DETAILED DESCRIPTION

Figure 1:
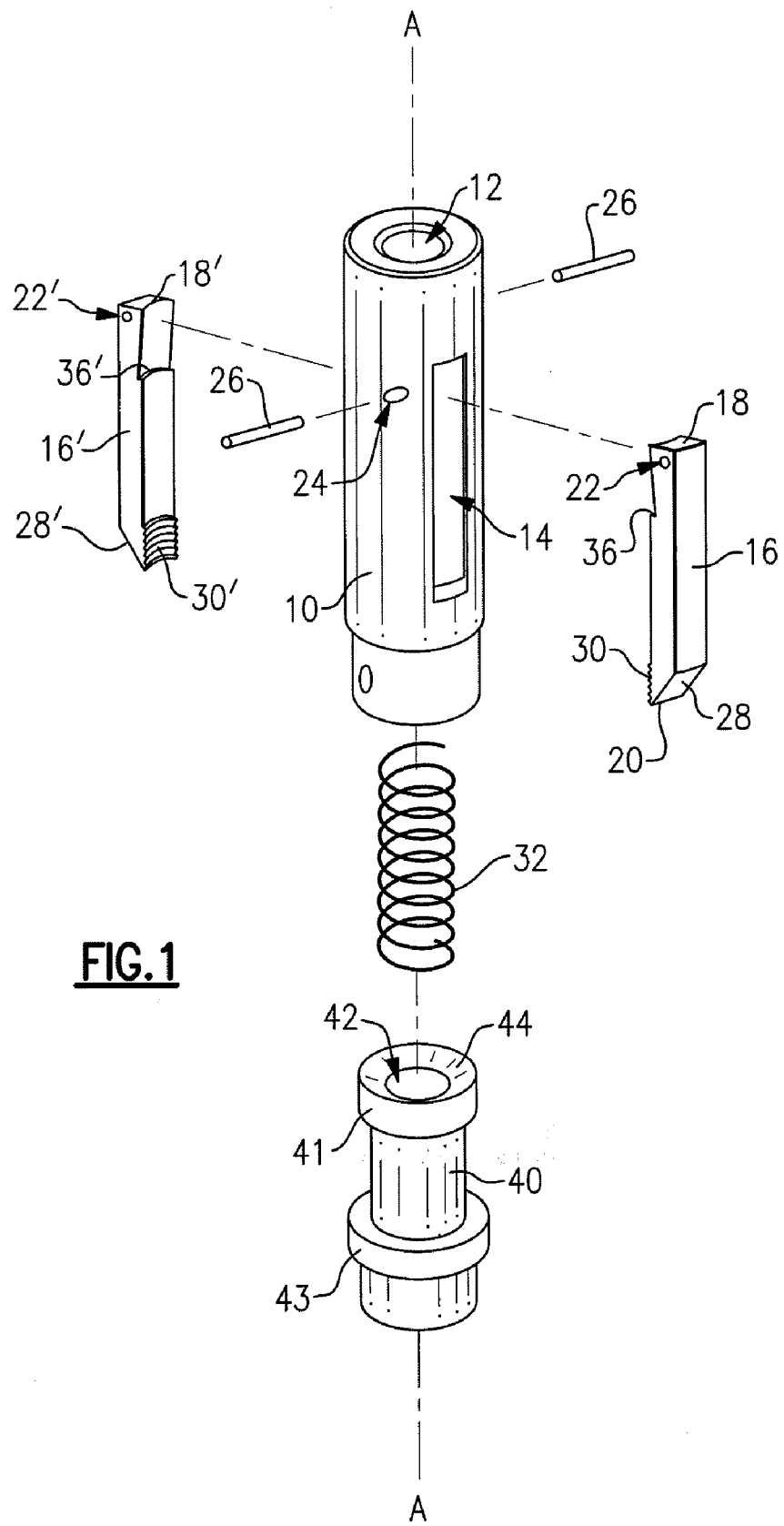
FIG. 1 is an exploded, perspective view of a first embodiment of the nut assembly of the invention.
Figure 2:
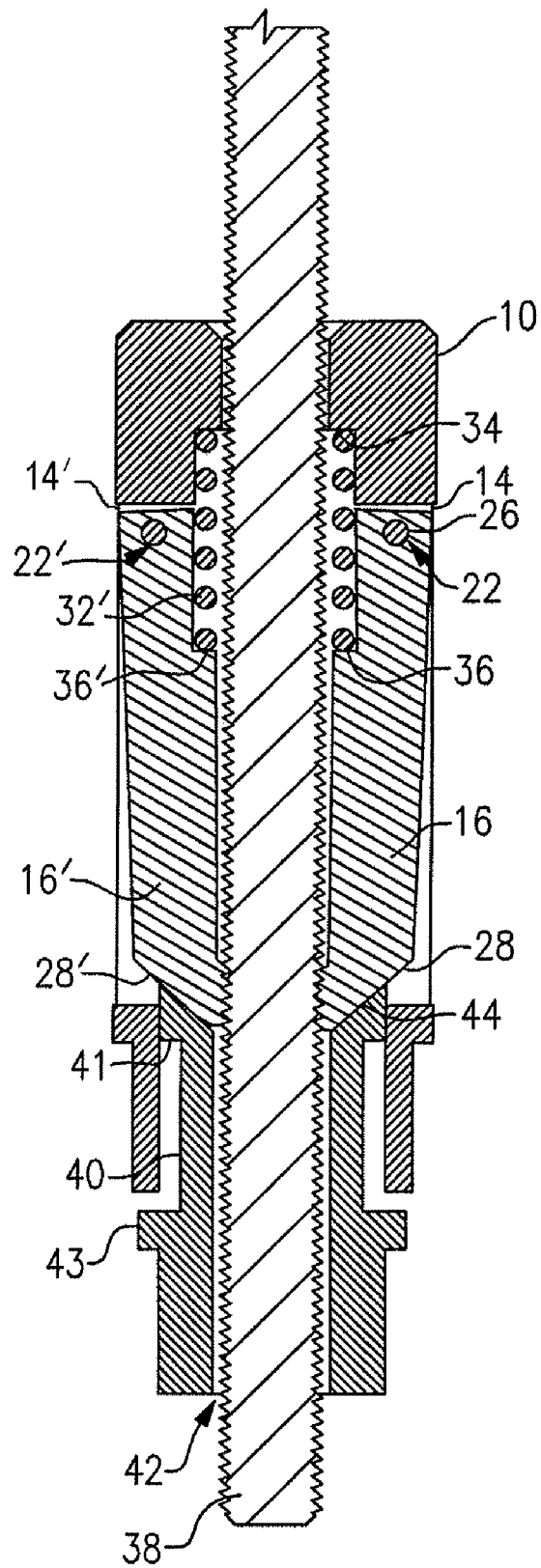
FIG. 2 is a front elevational view of the elements of FIG. 1 in section and in assembled condition.

The nut assembly of the invention is shown in a first embodiment in FIGS. 1 and 2, to which attention is initially directed. Bushing 10 has a through bore 12 with central axis A-A and a pair of axially elongated, through slots 14, 14' on opposite sides. A pair of identical, elongated legs 16, 16' each have first (18, 18') and second (20, 20') ends, respectively. Openings 22, 22' extend through legs 16, 16', respectively, adjacent ends 18, 18', and openings 24, 24' extend though bushing 10, parallel to one another and on opposite sides of axis A-A, on both sides of slots 14, 14'. Dowel pins 26, 26' extend with force fit into openings 24, 24' in bushing 10 and with slip fit through openings 22, 22' in legs 16, 16', whereby the legs are supported in slots 14, 14' for pivotal movement with respect to bushing 10.

Adjacent ends 20, 20', legs 16, 16' have external surface portions 28, 28' and internal surface portions 30, 30', respectively. Surface portions 28, 28' form portions of a conical plane concentrically surrounding axis A-A, while surface portions 30, 30' are cylindrical in form and each is tapped to provide a set of threads. A single coil spring 32 is positioned within bushing 10 and seated at one end upon annular shoulder 34, formed as a counter-bore in bore 12, and at the other end upon shoulders 36, 36' of legs 16, 16', respectively. Thus, spring 32 exerts a biasing force tending to move legs 16, 16' about their respective pivotal mountings with ends 20, 20' moving away from axis A-A. The extent of such pivotal movement of the legs is limited by contact of side edges of the legs with opposing side portions of slots 14, 14'.

The nut assembly of FIG. 1 is shown in FIG. 2 in association with threaded shaft 38. The threads on shaft 38 are formed for mating engagement with the threads on inner surface portions 30, 30' of legs 16, 16'. Thus, when legs 16, 16' are rotated in the direction of bias by spring 32, inner surface portions 30, 30' and the threads thereon are spaced outwardly from shaft 38 and its threads, permitting free relative axial movement of bushing 10 and shaft 38. When legs 16, 16' are rotated against the biasing force of spring 32 to move ends 20, 20' toward one another, the threads of inner surface portions 30, 30' engage the threads on shaft 38, permitting relative axial movement of bushing 10 and shaft 38 in response to relative rotational movement of the bushing and shaft.

Although various means may be employed to effect movement of legs 16, 16' between the positions wherein the threads on the legs are engaged and disengaged with the threads on shaft 38, including manually moving the legs when the nut assembly is employed in applications permitting manual access to the legs, the device shown in the illustrated version is second bushing 40. Shaft 38 extends through axial bore 42 of bushing 40 and surface 44, in the form of a truncated cone, encircles one end of bore 42. Outer surface portions 28, 28' of legs 16, 16' are, as previously described, conical and complementary with conical surface 44. Thus, when first and second bushings 10 and 40, respectively, are moved axially toward one another, surface 44 engages surface portions 28, 28' and continued movement produces rotation of legs 16, 16' about pins 26, 26' to move the threads of surface portions 30, 30' into engagement with the threads on shaft 38. Upon movement of bushings 10 and 40 away from one another, the legs are rotated by the bias of spring 32 to disengage the threads. Thus, the bushings may be moved freely with respect to the shaft to bring bushing 10 to an approximate, desired position upon the shaft, whereupon the threads on the pivotal bushing legs are placed in engagement with the threads on the shaft and more precise positioning of the bushing on the shaft is effected by relative rotation of the bushing and shaft. Bushing 40 includes a pair of flanges 41 and 43 between which is a portion of reduced diameter. Flanges 41 and 43 are provided for a purpose described later in connection with an application wherein the nut assembly of FIGS. 1 and 2 is employed in an adjustable pole assembly.

Figure 3:
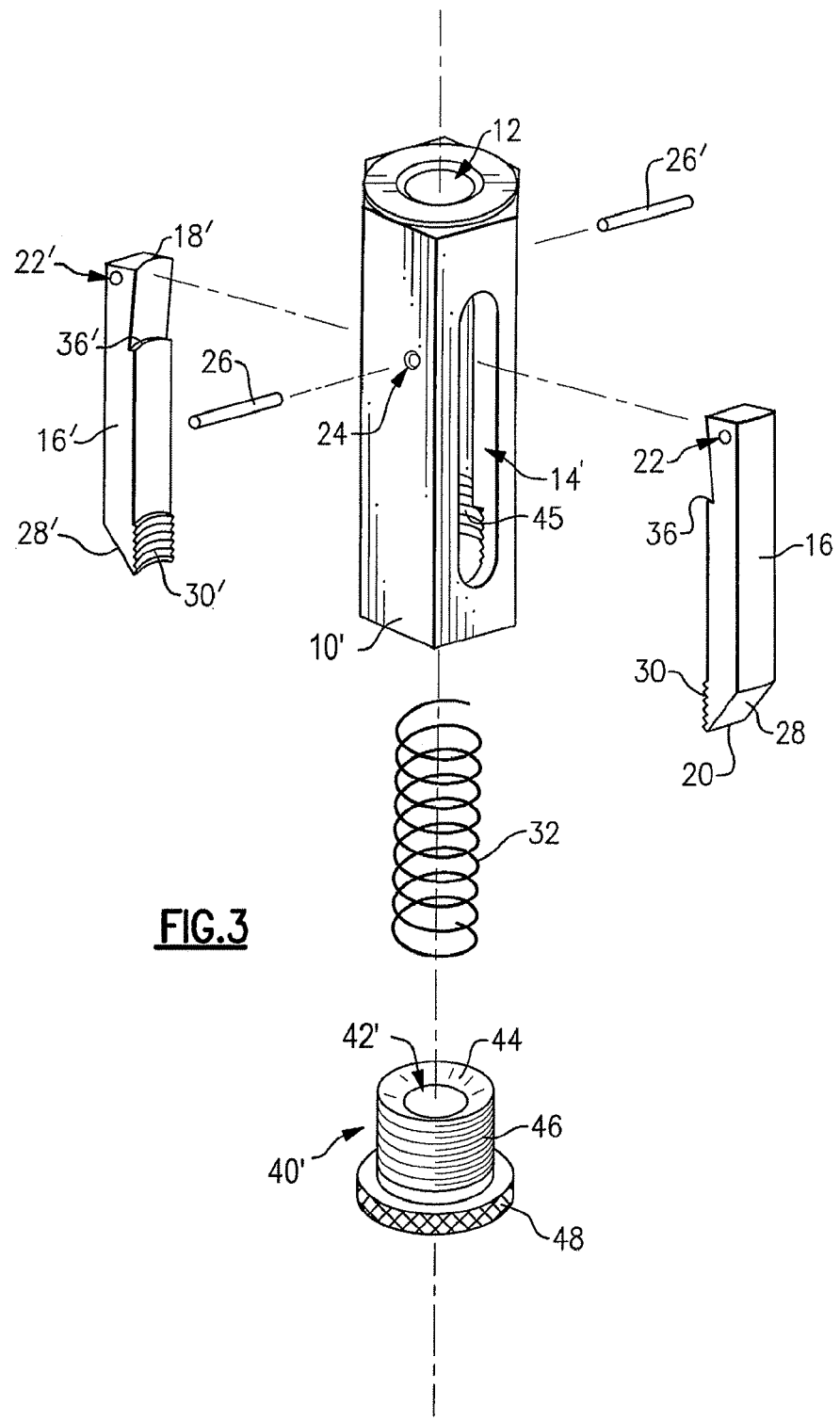
FIG. 3 is an exploded, perspective view of a second embodiment of the nut assembly.
Figure 4:
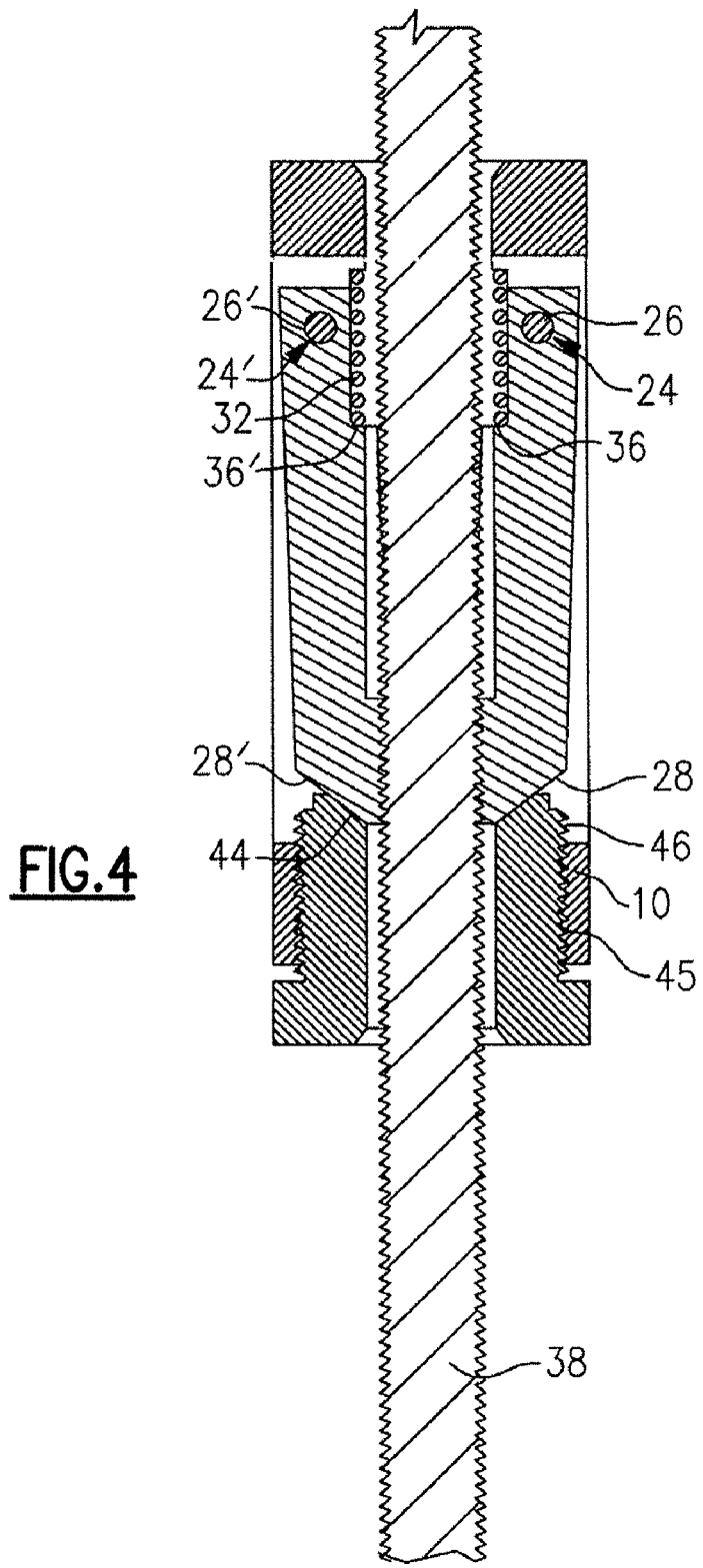
FIG. 4 is a front elevational view of the elements of FIG. 3 in section and in assembled condition.

Turning now to FIGS. 3 and 4, the nut assembly is shown in an embodiment wherein the two bushings are relatively moved to actuate the pivot legs by rotation rather than by direct, linear movement, as in the first embodiment. The same reference numerals are used in FIGS. 3 and 4 as in FIGS. 1 and 2 for elements common to the two embodiments, although some may be of alternate forms. For example, bushing 10 is made from round stock in the first embodiment and hex stock in the second, although both have the same axial bore with counterbore to support the same coil spring, as well as the same slots wherein the same legs are pivotally mounted. In the second embodiment, bushing 10 is internally threaded within a portion 45 of bore 12 surrounding ends 20, 20' of legs 16, 16', respectively. Second bushing 40 is externally threaded over portion 46 of its length and provided with a knurled surface over portion 48. Conical surface 44 again surrounds bore 42 and coacts with surface portions 28, 28' in effecting rotation of legs 16, 16'. Although inward movement of ends 20, 20' of the legs to bring the threads on the legs and shaft into mutual engagement is effected by relative axial movement of first and second bushings 10 and 40, respectively, the axial movement is effected by relative rotational movement of the two bushings in the second embodiment.

Figure 5:
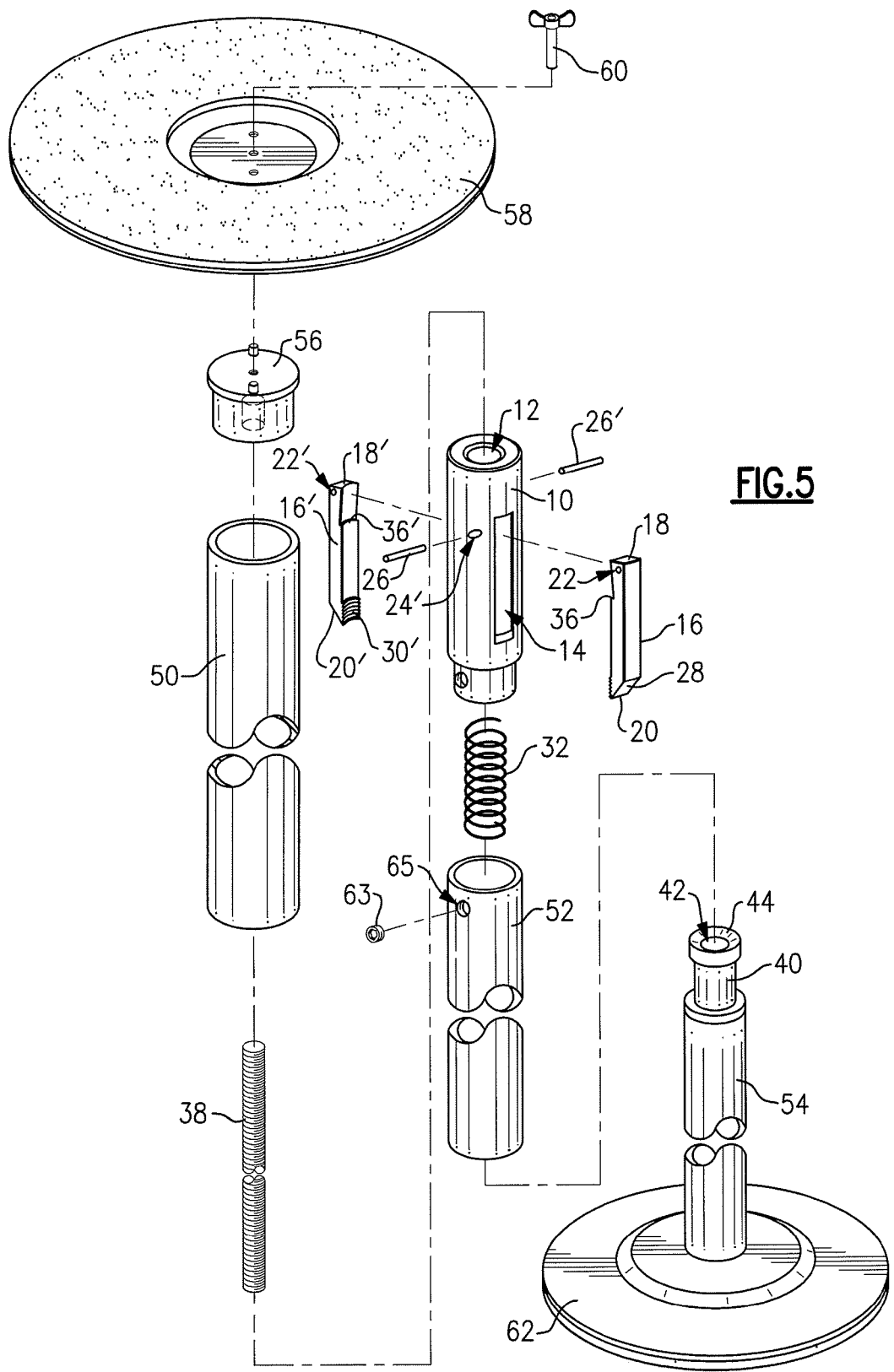
FIG. 5 is an exploded, perspective view of an adjustable pole assembly in association with the first embodiment of the nut assembly.

The nut assembly of FIGS. 1 and 2 is shown in a practical application in FIGS. 5 through 7, in association with a pole of adjustable overall length. The pole is formed by three, hollow, telescopingly engaged rods, termed for convenience upper rod 50, intermediate or push-up rod 52 and lower rod 54, although it will be understood that the pole may be employed in orientations other than vertical. Other terms, such as top, bottom, upwardly, etc. are used consistently with a vertical orientation of the pole. Bushing 56 is secured to plate 58 by wing bolt 60 and is fixedly attached, by welding or other means, to rod 50 within the upper end thereof. The upper end of shaft 38 is affixed to bushing 56 and extends coaxially through upper rod 50. Bottom plate 62 is formed integrally with lower rod 54. Bushing 10 is fixedly attached to push up rod 52, extending into the upper end thereof, and second bushing 40 extends into the upper end of lower rod 54 and is fixedly attached thereto. Set screw 63 extends through threaded opening 65 in push up rod 52. As seen in FIG. 6, set screw extends into the reduced diameter portion of bushing 40, between flanges 4 and 43, without contacting bushing 40, thereby limiting relative axial movement of bushing 40 and push up rod 50, and preventing excessive movement of push up rod 52 relative to the assembly of lower rod 54.

The elements are shown in FIG. 6 with push up rod 52 and lower rod 54 positioned so that conical, outer surface portions 28, 28' of legs 16, 16' rest upon conical surface 44 of bushing 40, thereby rotating the legs to bring the threads on legs 16, 16' into engagement with the threads on shaft 38. In this position, rod 52 may be rotated while rods 50 and 54 remain stationary, thereby rotating bushing 10 upon stationary shaft 38 to move upper rod 50 axially with respect to push up rod 52 and lower rod 54. This movement changes the overall length of the pole by a relatively small increment, providing the final adjustment of the pole. For larger increments of pole length adjustment, push up rod 52 is grasped and lifted upwardly a small distance (after using the threaded connection to remove upper plate 58 from engagement with an opposing surface) while bottom plate 62 and bushing 40 remain stationary. Pivot leg surfaces 28, 28' are thus removed from contact with surface 44 of bushing 40, allowing spring 32 to rotate legs 16, 16' outwardly to disengage the threads on the legs with those on shaft 38.

Upper rod 50 may then be freely moved relative to lower rod 54, thus changing the overall length of the pole and the spacing between upper and lower plates 58 and 62, respectively.

From the foregoing, it will be seen that the nut assembly of the invention provides all the advantages of quick adjustment along the length of a threaded shaft in either large or small increments. The nut is formed in a plurality of physically separate sections, each having a surface portion which is threaded for movement into and out of engagement with the shaft. The nut sections are pivotally mounted on a bushing which surrounds the threaded shaft and, among the means which may be employed to transmit movement to the nut sections, there is disclosed a second bushing which is moved axially relative to the first bushing either by direct, linear movement or by rotational movement through threaded connection of the first and second bushings.

The nut assembly is disclosed in a typical application wherein it is employed in an adjustable length pole, such as that of preciously referenced U.S. Pat. No. 5,826,847. The nut assembly and pole of the present invention decrease manufacturing cost and improve the functions of the prior patent. The single coil spring of the present nut assembly urges the threaded nut sections toward movement away from engagement with the threaded shaft, providing a reverse bias compared to the two springs of the prior patent. This allows the nut assembly to operate as part of the intermediate, push-up rod instead of as part of the lower rod, as in the prior patent. This is advantageous because the push-up hollow rod is of greater diameter than the lower rod, thereby providing more usable space for augmenting the functions of the nut sections. This feature also lessens the expense and increases rigidity of the lower rod assembly, because the lower rod is welded or otherwise fixed directly to the bottom plate, rather than requiring rotation of the lower rod relative to the plate as in the prior patent. The present design also provides better primary alignment of the threaded shaft and bushings, a typically equiring less rotational force in threading operations involving the engaged thread components.

What is claimed is:

1. A nut assembly for cooperative operation with an externally threaded shaft having a first diameter and a first, central axis, said nut assembly comprising:
    a. a first bushing having a first, through bore of second diameter, so as to be larger than said first diameter and having a second, central axis, and at least two slots formed therethrough;
    b. a second bushing located at least partially inside said first bushing and having a second, through bore of third diameter, so as to be larger than said first diameter and having a third, central axis, said first and second bores configured to have the shaft extend therethrough with said first, second and third axes coaxial;
    c. at least two, physically separate sections each having a first surface portion formed with thread portions configured to be mateable with the thread of said shaft;
    d. means for pivotally attaching said sections to said first bushing, wherein each of said sections is positioned within a respective one of said slots and is moveable about said pivotally attaching means between first and second positions within the respective one of said slots, and wherein said surface portion of each of said sections is configured to be spaced radially outwardly from said shaft, and in threaded engagement with said shaft, respectively; and
    e. each of said sections having a second surface portion cooperable with a third surface portion of said second bushing for movement of said sections between said first and second positions thereof in response to relative axial movement of said first and second bushings.

2. The nut assembly of claim 1 and further including means for biasing said sections toward movement to said first positions thereof.

3. The nut assembly of claim 2 wherein said biasing means comprises a single spring connected to both of said sections.

4. The nut assembly of claim 1 wherein said sections are elongated, having first and second ends and pivotally connected to said first bushing adjacent said first end and having said first surface portion adjacent said second end.

5. The nut assembly of claim 1 wherein said first and second bushings are physically unconnected to one another and said relative axial movement is effected by direct, relative, linear movement of said first and second bushings.

6. The nut assembly of claim 1 wherein each of said first surface portions extends less than 180 degrees about a pitch circle concentric with said first and second bushings.

7. The nut assembly of claim 1 wherein each of said second and third surface portions are conical and configured to be concentric with said second, central axis when assembled with said externally threaded shaft.

8. A nut assembly comprising:
    a. a first bushing having a first through, axial bore of first diameter and having a first central axis and at least two slots formed therethrough;
    b. at least two elongated legs each having a surface portion formed with thread portions, wherein each of said legs is positioned within a respective one of said slots such that each of said surface portions is configured to extend into said first axial bore; and
    c. means for pivotally mounting said legs upon said first bushing for movement of said legs between a first position within the respective one of said slots, wherein said thread portions of each of said surface portions are spaced a first distance outwardly of said first central axis, and a second position within the respective one of said slots, wherein said thread portions of each of said surface portions are spaced a second distance outwardly of said first central axis; and
    d. a second bushing located at least partially inside said first bushing and having a second, through bore of second diameter, so as to be larger than said first diameter and having a second, central axis, said first and second axes coaxial.

9. The nut assembly of claim 8 wherein said legs are mounted on diametrically opposite sides of said first bushing for movement of said surface portions toward and away from one another as said legs are moved between said first and second positions.

10. The nut assembly of claim 9 wherein each of said sections includes a first end and a second end, said surface portion being adjacent said first end and said pivotally mounting means being adjacent said second end.

* * * * *